March 29, 1966 J. A. PATRICK ETAL 3,243,501
WELDED CONNECTION FOR INSULATED WIRES
Filed Jan. 18, 1965
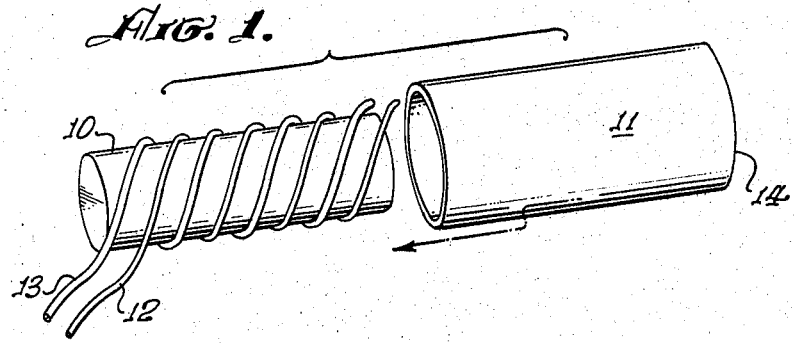
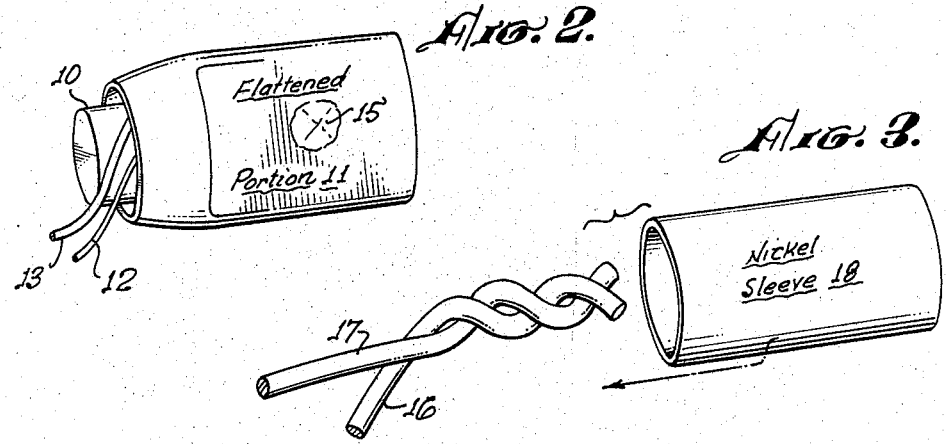
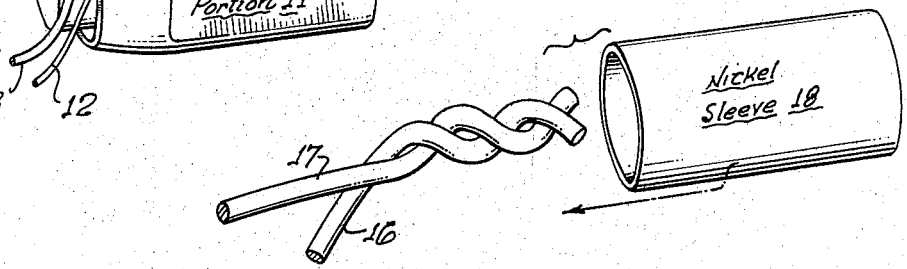
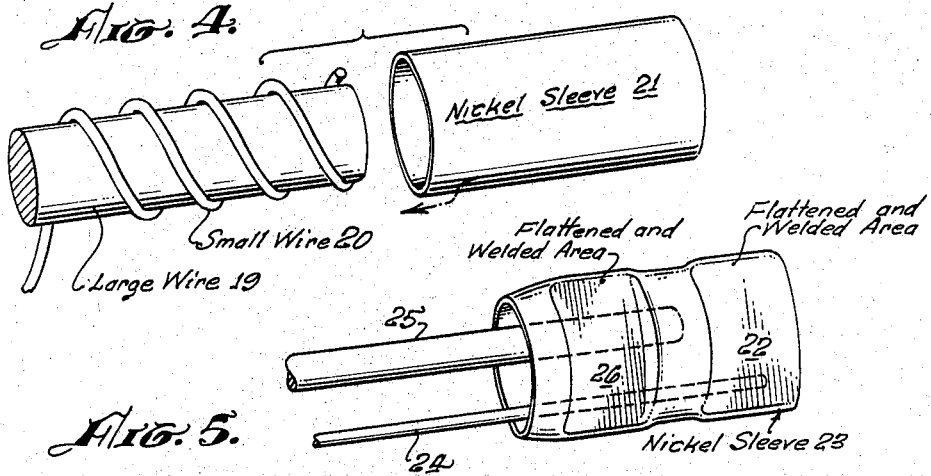
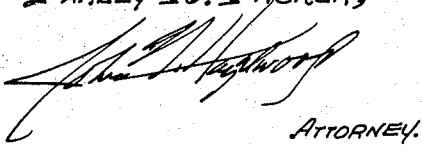
INVENTORS.
JAMES A. PATRICK,
PARLEY R. PACKER,
By
ATTORNEY.

United States Patent Office 3,243,501
Patented Mar. 29, 1966

3,243,501
WELDED CONNECTION FOR INSULATED WIRES
James A. Patrick, Montclair, and Parley R. Packer, Alta Loma, Calif., assignors to General Dynamics Corporation, Pomona, Calif., a corporation of Delaware
Filed Jan. 18, 1965, Ser. No. 426,205
6 Claims. (Cl. 174—87)

This invention relates to connectors, particularly to connectors for wires of various sizes, and more particularly to connector devices and methods for connecting a plurality of lengths of wire.

Prior to the present invention, enamelled magnet wire was inter-connected by stripping the wire of its enamel insulation prior to soldering or other means of connection. The stripping was generally done with a chemical solvent which is tedious and time-consuming. This invention utilizes a process which does not require pre-stripping.

Certain problems arise from the use of soldering techniques for connections in small sizes of enamelled magnet wire. Contamination of items in the near vicinity will result from splattered solder flux; the tiny wires may be burned by the relatively sustained heat of the soldering iron; and chemical stripping is needed for soldering these smaller size wires. The use of a chemical stripper in such a case is a hazard in itself because of the possibility of accidentally touching it to the coil which is wound from the magnet wire. Should this happen, a short is likely where the insulation is deteriorated by the chemical stripper. The same danger is inherent from burned insulation when working with a soldering iron on such a small workpiece.

All of the above difficulties are eliminated by the present invention which utilizes resistance (cross) welding techniques. This invention provides a connection device and method which eliminates the necessity of stripping the enamel insulation from the wires prior to connection of the wire to a point of use or prior to interconnecting enamelled magnet wires.

Therefore it is an object of this invention to provide an improved connecting device and method for wires of various sizes.

A further object of the invention is to provide a wire connection device and method that is simple to apply and economical to make.

Another object of the invention is to provide an improved method for connecting enamelled magnet wires which possess not only the high tensile strength necessarily required of such a connection, but also the other characteristics required of a good conductor.

Another object of the invention is to provide a means and method of connecting enamelled magnet wire by resistance welding techniques without the necessity of first stripping the enamel insulation from the wire.

Other objects of the invention will become readily apparent from the following description and the accompanying drawings wherein:

FIG. 1 is an exploded view illustrating the components of an embodiment of the connector device of the invention for connecting small wires;

FIG. 2 is a view illustrating the end configuration of the FIG. 1 components;

FIG. 3 is an exploded view of another member for interconnecting relatively large wires;

FIG. 4 is an exploded view illustrating an interconnection of large and relatively small wires in accordance with the invention; and FIG. 5 is a view illustrating another method according to the invention for interconnecting large and relatively small wires.

Briefly, the invention relates to both a connector and method of electrically fastening together two or more lengths of wire such as enamelled magnet wire. The magnet wires are either twisted together, one wrapped around another, or wrapped around a mandrel, and then connected to a closely fitted tube which is slipped over the wires or welded to the tube without wrapping or twisting. A cross welding technique employing both mechanical pressure and resistance welding is employed to compress the tube about the magnet wire and mandrel where utilized, the welding current being sufficient to melt the enamel such that it will squeeze out of the joint area, whereby a secure electrical and mechanical connection is achieved between the magnet wires.

Referring now to the drawings, a method for interconnecting wires such as enamelled magnet wires of diffent sizes without the necessity of first stripping the enamel insulation is illustrated in FIGS. 1 and 2. This method comprises utilizing a mandrel such as a length of wire, such as nickel wire 10, a length of thin-wall tube 11 constructed for example of nickel and magnet wires 12 and 13 wrapped around the wire 10. The relative diameters are such that the length of wire 10, with enamelled magnet wires 12 and 13 wrapped around it, will fit inside the nickel tubing 11. By way of example only, the representative dimensions of tubing 11 may be 0.1 inch in length, 0.04 inch ouside diameter, and 0.005 inch wall thickness, thus illustrating the small size of the connector assembly which may be worked with. The diameter of the nickel wire 10 will vary according to the internal diameter of tubing 11 and the size of the magnet wire being joined. For example, with tubing 11 of the size exemplified above, the nickel wire 10 may be AWG #26 wire, and with wire 12 being AWG #44 magnet wire and wire 13 being AWG #38 magnet wire.

The method of connection of the FIG. 1 components is illustrated in FIGS. 1 and 2, wherein the lengths of magnet wire 12 and 13 to be joined together are wrapped around the nickel wire 10, without stripping of the enamel insulation of the wires 12 and 13, and the nickel tube 11 is slipped over the wrapped portion of the nickel wire 10. The tube 11 is gently flattened as indicated by legend in FIG. 2. If desired, the rearward end 14 of the nickel tube 11 as shown in FIG. 1 may be crimped shut before slipping the tube over the wrapped nickel wire 10. A cross-weld (resistance weld) 15 is made across the flattened portion of the tube 11, which is accomplished by bringing the electrodes of a welder together on the opposite sides of the tube flattened portion. The process is completed by clipping of the excess nickel wire protruding from the end or ends of the tube 11. There should be sufficient turns of the magnet wires 12 and 13 around mandrel 10 to assist the wires in withstanding any mechanical stresses that may be imposed upon them in handling. The mandrel 10 serves as an anvil or support to prevent the small wires 12 and 13 from being separated or pushed to one side of the tube 11 during the flattening and welding operation. In addition, the mandrel 10 must be constructed from an electrical conductive material so that the welding current can flow between welding electrodes positioned on each side of the tube 11. A preferred weld will include the fusion of the tube 11 to the wires 12 and 13 and the fusion of the wires to the mandrel 10. However, the fusion of the tube to the wires provides a satisfactory connection for small wires when the tube has been flattened against the mandrel thus physically holding the wires therebetween.

FIG. 3 illustrates the connection method of two lengths of relatively large diameter of enamelled magnet wire as compared to the wires connected by the FIG. 1 device. The nickel mandrel is omitted due to the size of the wires and the lengths of enamelled magnet wire 16 and 17 are twisted about one another. The twisted wires 16 and 17 are inserted into a nickel sleeve or tube 18 or the sleeve slipped over the wires as indicated. The sleeve 18 is then flattened, and the cross-weld is performed as described above. Again the rearward end of the sleeve or tube 18 may be crimped shut if desired.

FIG. 4 illustrates the connection of a relatively large enamelled magnet wire 19 to a relatively small enamelled magnet wire 20. In this application of the invention, the larger wire 19 replaces the nickel mandrel utilized in FIG. 1, in that the smaller wire 20 is wrapped around the larger wire 19. Following the wrapping operation, the wires 19 and 20 are inserted into a sleeve or tube 21 or the sleeve 21 slipped over the wires as indicated by the arrow. The tube or sleeve 21 is then flattened and a cross-weld (resistance weld) is made across the flattened portion of the tube.

As pointed out with respect to FIGS. 1 and 2, it is important that the twisted or wound portion of the wire ends be long enough so that the twists or turns serve to share any mechanical stresses that may be imposed on the weld. The welding parameters vary with the size of the wires being connected and the type of welding apparatus being used.

An alternative method of connecting a relatively small enamelled magnet wire to a relatively large wire is illustrated in FIG. 5. One end portion 22 of a tube or sleeve 23 is flattened onto a smaller enamelled magnet wire 24 and a cross-weld, as described above, is made across this flattened area, thus insuring contact between tube 23 and wire 24. A larger wire 25 is then inserted into the other end portion 26 (unflattened portion) of tube or sleeve 23. The end portion 26 is then flattened and the larger wire 25 is welded to sleeve 23 by the cross-weld technique, which technique, as described above, is accomplished by bringing the electrodes of a welder on opposite side of the flattened portion of the sleeve.

Tests have been conducted to determine the resistance of the interconnections made in accordance with the present invention as compared with interconnections made by the prior known stripping and soldering operation. These tests were made on the invention connectors as follows:

(1) The resistance of each wire in a connection was measured and the values totaled.

(2) The overall resistance of the wires plus the weld joint was measured.

(3) The wire resistance value was subtracted from the overall resistance value, the difference being the joint resistance. The average joint resistance was found to be one milli-ohm (0.001 ohm).

Tests were then conducted on the same wire size combinations joined by the prior known stripping and soldering method, these tests being conducted in the same manner as described above. The soldered joints showed a joint resistance of approximately 0.001 ohm, thus varifying that the inventive method herein produces electrical characteristics at least the equal of those produced by the prior known interconnection methods which require stripping of the insulation material prior to interconnection.

Tests were also performed to determine whether or not the welded connection of the invention tended to weaken the wires by pinching or embrittlement. For example, in connections of a large and a small wire, where the small wire was pulled from the tube or sleeve it broke at a point away from the connection, proving that no weakening of the wire is created by the inventive method. Where the larger of the two wires was pulled, it broke at the point where it was squeezed or necked down by the flattening of the sleeve. However, the measured breaking strength was above 70% of the rated breaking strength of the larger wire, thus indicating that the strength of the wire is not seriously diminished by the connection method of the invention.

Additionally, micrographic examinations of sectioned welds have been conducted under magnification which showed that the wires were solidly fused to the nickel sleeve and to one another where the wires were wound or twisted together at the point of the weld.

The results of joint resistance tests, physical strength tests and micrographic examination show that this method of connecting enamelled magnet wires is very satisfactory, while greatly reducing the expense of such connection over the prior known interconnection methods.

While specific types of material have been described herein to illustrate the invention, it is not intended to limit the inventive concept to any specific types of materials since this concept is adaptable to various types of wire and/or sleeve or tubing. Additionally this method of interconnection may be utilized for bonding material such as magnet wires to terminal posts or other required connections.

It has thus been shown that this invention overcomes all of the difficulties and expense encountered by the prior known interconnection methods for wires, and particularly enamelled magnet wires, while providing as great or greater electrical and strength characteristics as connections made by the prior known methods.

Although particular illustrative examples of ways to interconnect wire, particularly magnet wire, have been illustrated and described, modifications and changes will become apparent to those skilled in the art, and it is intended to cover in the appended claims all such modifications and changes as come within the true spirit and scope of this invention.

What we claim is:

1. A connection for insulated wire comprising: a pair of insulated wires of different diameters wrapped around a mandrel constructed from conductive material, and a sleeve of conductive material positioned around the wrapped wires, said sleeve being flattened against said wires at least one portion thereof and resistance welded to at least the wires at the flattened portion of the sleeve, whereby a connection between the wires is provided having high tensile strength and electrical properties.

2. A connection for insulated wire comprising: a pair of insulated wires of different diameters, the smaller of the wires being wrapped around a straight end portion of the larger wire, and a sleeve of conductive material positioned around the wrapped wires, said sleeve being flattened against said wires at at least one portion thereof and resistance welded to the wires at the flattened portion of the sleeve, thus producing a connection having high tensile strength and electrical characteristics.

3. A connection for insulated wire comprising: a sleeve of conductive material, and a pair of insulated wires of different diameter, one of said pair of wires being held within the sleeve by a resistance weld across a flattened portion of said sleeve, the other of said pair of wires being held at another location within said sleeve by a resistance weld across another flattened portion of the sleeve, said connection being thus provided with electrical and high tensile strength qualities.

4. The connection defined in claim 1, wherein said conductive material of said mandrel and said sleeve is nickel.

5. The connection defined in claim 2, wherein said conductive material of said sleeve is nickel.

6. The connection defined in claim 3, wherein said conductive material of said sleeve is nickel.

References Cited by the Examiner
UNITED STATES PATENTS

| | | | |
|---|---|---|---|
| 1,563,812 | 12/1925 | Waller | 174—94 X |
| 2,250,156 | 7/1941 | Ferguson | 174—84 X |

FOREIGN PATENTS

| | | |
|---|---|---|
| 695,389 | 8/1953 | Great Britain. |

References Cited by the Applicant
UNITED STATES PATENTS

| | | |
|---|---|---|
| 2,564,463 | 8/1951 | Burns. |
| 2,927,193 | 3/1960 | Ewald. |
| 3,040,150 | 6/1962 | Rueger. |

LARAMIE E. ASKIN, *Primary Examiner.*
DARRELL L. CLAY, *Examiner.*